United States Patent
Kokko

(10) Patent No.: US 8,067,524 B2
(45) Date of Patent: *Nov. 29, 2011

(54) USE OF HYDROPHOBICALLY MODIFIED POLYAMINAMIDES WITH POLYETHYLENE GLYCOL ESTERS IN PAPER PRODUCTS

(75) Inventor: Bruce Jerome Kokko, Neenah, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 1528 days.

This patent is subject to a terminal disclaimer.

(21) Appl. No.: 10/650,737

(22) Filed: Aug. 29, 2003

(65) Prior Publication Data

US 2004/0035538 A1 Feb. 26, 2004

Related U.S. Application Data

(62) Division of application No. 09/852,997, filed on May 10, 2001, now Pat. No. 6,673,205.

(51) Int. Cl.
*C08G 69/26* (2006.01)

(52) U.S. Cl. ........ 528/271; 524/599; 524/606; 524/612; 525/927

(58) Field of Classification Search .................. 525/927; 524/599, 606, 612; 528/271
See application file for complete search history.

(56) References Cited

U.S. PATENT DOCUMENTS

| | | | |
|---|---|---|---|
| 3,138,473 A | 6/1964 | Floyd et al. | |
| 3,248,280 A | 4/1966 | Hyland, Jr. | |
| 3,434,984 A | 3/1969 | Hyland, Jr. | |
| 3,448,005 A | 6/1969 | Allison, Jr. et al. | |
| 3,462,383 A | 8/1969 | Longoria, III et al. | |
| 3,632,559 A | 1/1972 | Matter et al. | |
| 3,635,842 A | 1/1972 | Longoria, III et al. | |
| 3,642,572 A | 2/1972 | Endres et al. | |
| 3,692,092 A | 9/1972 | Longoria | |
| 3,755,220 A | 8/1973 | Freimark et al. | |
| 4,066,494 A | 1/1978 | Scharf et al. | |
| 4,144,123 A | 3/1979 | Scharf et al. | |
| 4,250,299 A | 2/1981 | Lehmann et al. | |
| 4,499,153 A | 2/1985 | von Bonin et al. | |
| 4,689,374 A | 8/1987 | Hansson et al. | |
| 4,722,964 A | 2/1988 | Chan et al. | |
| 4,749,444 A | 6/1988 | Lorz et al. | |
| 4,816,073 A | 3/1989 | Helmer et al. | |
| 4,975,499 A | 12/1990 | Bachem et al. | |
| 5,032,226 A | 7/1991 | Winiker | |
| 5,039,787 A | 8/1991 | Tanaka et al. | |
| 5,200,036 A | 4/1993 | Noda | |
| 5,240,562 A | 8/1993 | Phan et al. | |
| 5,302,335 A * | 4/1994 | Naganawa et al. ........... 264/333 | |
| 5,314,721 A * | 5/1994 | Muller et al. ................. 427/386 | |
| 5,364,927 A | 11/1994 | Devore et al. | |
| 5,536,370 A | 7/1996 | Scherr et al. | |
| 5,560,929 A * | 10/1996 | Hedstrand et al. ............ 424/486 | |
| 5,569,686 A * | 10/1996 | Makati et al. ................. 523/409 | |
| 5,624,532 A | 4/1997 | Trokhan et al. | |
| 5,630,907 A | 5/1997 | Nilz et al. | |
| 5,863,385 A | 1/1999 | Siebott et al. | |
| 5,955,567 A | 9/1999 | Bigorra Llosas et al. | |
| 6,075,000 A | 6/2000 | Rohrbaugh et al. | |
| 6,083,348 A | 7/2000 | Auhorn et al. | |
| 6,222,006 B1 | 4/2001 | Kokko et al. | |
| 6,224,714 B1 | 5/2001 | Schroeder et al. | |
| 6,251,175 B1 * | 6/2001 | Zhu et al. ..................... 106/31.58 | |
| 6,274,667 B1 | 8/2001 | Shannon et al. | |
| 6,287,418 B1 | 9/2001 | Schroeder et al. | |
| 6,303,002 B1 | 10/2001 | Linhart et al. | |
| 6,365,667 B1 | 4/2002 | Shannon et al. | |
| 6,673,205 B2 * | 1/2004 | Kokko ........................ 162/164.3 | |
| 2002/0096281 A1 | 7/2002 | Wallenius et al. | |
| 2003/0024667 A1 | 2/2003 | Wallenius et al. | |

FOREIGN PATENT DOCUMENTS

| | | |
|---|---|---|
| CA | 2296826 | 7/2000 |
| CA | 2296892 | 7/2000 |
| CA | 2296894 | 7/2000 |
| EP | 0 471 137 A1 | 2/1992 |
| WO | WO 93/21382 | 10/1993 |
| WO | WO 98/39376 | 9/1998 |
| WO | WO 00/43423 | 7/2000 |
| WO | WO 00/43428 | 7/2000 |
| WO | WO 00/43429 | 7/2000 |
| WO | WO 00/43440 | 7/2000 |
| WO | WO 01/36491 A1 | 5/2001 |

OTHER PUBLICATIONS

Holmberg, Krister Surfactants and Polymers in Aqueous Solution, 2nd ed. [online], John Wiley & Sons, c2003, pp. 109, 110 & 199 [retrieved on Aug. 21, 2006] Retrieved from the Internet< URL: http://www3.interscience.wiley.com/cgi-bin/booktoc?ID=104554816&CRETRY=1&SRETRY=0> .*

ChemCool Chemistry Dictionary, definition for complex, no date [retrieved on Jun. 30, 2008], Retrieved from the Internet: <URL: http://www.chemicool.com/dictionary.html>.*

T.F. Tadros, *Surfactants, Industrial Applications*, in 16 Encyclopedia of Physical Science and Technology 391-392 (Robert A. Meyers ed., 1992).

* cited by examiner

*Primary Examiner* — Matthew Daniels
*Assistant Examiner* — Dennis Cordray
(74) *Attorney, Agent, or Firm* — Laura L. Bozek

(57) ABSTRACT

The present invention uses hydrophobically modified polyaminamide with standard wet strength agent to produce a softer and more absorbent paper material. The hydrophobically modified polyaminamide is substantive to cellulosic fibers, thus is able to carry polyethylene glycol esters or ethers, a non-substantive material to cellulosic fiber as stable complexes, into the paper product.

5 Claims, No Drawings

USE OF HYDROPHOBICALLY MODIFIED POLYAMINAMIDES WITH POLYETHYLENE GLYCOL ESTERS IN PAPER PRODUCTS

This is a division of application Ser. No. 09/852,997, filed May 10, 2001, now U.S. Pat. No. 6,673,205, which is incorporated herein by reference.

FIELD OF THE INVENTION

The present invention relates to an absorbent paper product with hydrophobically modified polyaminamides, preferably stable complexes of these with non-ionic fatty polyalkoxides, to increase the wet/dry tensile ratio and wettability of paper products, thereby, improving paper softness and absorbency. The present invention further relates to a process for producing the absorbent paper product of the present invention.

BACKGROUND OF THE INVENTION

There are many characteristics of absorbent paper products, such as towel and tissue product, that must be considered in producing a final product having desirable attributes that make it suitable and preferred for the product's intended purpose. Absorbency, strength (both wet and dry), and softness are among the most important and desirable characteristics of disposable paper towels. Absorbency is the ability of a product to absorb and retain liquid. Overall absorbency as perceived by the consumer is generally considered to be a combination of the total quantity of liquid a given mass of paper will absorb at saturation, as well as the rate at which the mass absorbs the liquid. Strength is the property of a paper product that causes the product to be held together while in use. Finally, softness is the product property accounting for the pleasing tactile sensations imparted to the human anatomy while the product is in use. In general, the major easily measured determinants of perceived softness include stiffness and bulk (density), with lower stiffness and higher bulk (lower density) generally improving perceived softness and/or tactile perception of the products.

These three product attributes often run counter to one another. For example, as strength is increased, softness and absorbency generally decrease. Consumer product companies and vendors are constantly searching for methods/materials to either increase softness and absorbency while maintaining or increasing strength or to increase strength while maintaining or increasing absorbency and softness.

To improve softness, standard paper making processes often add chemicals, e.g., softeners and debonders, to a fiber furnish or web to improve or change the properties of the web. Traditionally, softeners and debonders are used in the papermaking process to enhance softness or to adjust strength. Typically, these chemicals are added to the wet end of the paper making process, i.e., in the paper making slurry. When used in this manner, these chemicals can react with fines, pitch, sand and other materials associated with pulp fibers to form deposits. Deposits negatively impact productivity because they blind fabrics and plug felts. Significant expenses must be incurred to remove the deposits. In some instances, the presence of these chemicals requires adjustment of the system pH. Because of the fatty acid groups, hydrophobicity is imparted on the paper product and this renders it non-absorbent. In some cases, additional expense must be incurred when hydrophilic surfactants are used to restore or impart absorbency. In some cases, it will be desirable to effect significant reductions in ultimate tensile strength. These are most easily obtained when debonders are added at the wet end.

These chemicals have occasionally been sprayed onto the wet web prior to drying. These processes can suffer from the disadvantages of contamination and materials loss while overspray and mist created during the spraying process can be irritating to the paper machine attendants. Unretained chemicals applied in this manner are usually recirculated back to the wet end where they may also react with fines, pitch, sand, and other materials associated with the pulp fibers to form deposits and may require pH adjustment. Deposits negatively impact performance and are expensive to remove and clean up. Adding debonders by spraying is not usually as effective in reducing ultimate tensile strength as is wet end addition.

The use of wet strength agents to enhance the wet strength of a paper web is widely known. For example, Westfelt described a number wet strength agent materials and discussed their chemistry in Cellulose Chemistry and Technology, Volume 13, at pages 813-825 (1979). Freimark et al. in U.S. Pat. No. 3,755,220 issued Aug. 28, 1973 mention that certain chemical additives known as debonding agents interfere with the natural fiber-to-fiber bonding that occurs during sheet formation in paper making processes. This reduction in bonding leads to a softer, or less harsh, sheet of paper. Freimark et al. go on to teach the use of wet strength agents in conjunction with the use of debonding agents to off-set the undesirable effects of the debonding agents on the paper strength. These debonding agents reduce both dry tensile strength and wet tensile strength.

To impart greater softness to the paper product, styrene-butadiene latexes can be used as the binder system. However, these styrene-butadiene latexes are usually either nonionic in character or else are partially anionic due to inclusion of anionic comonomers or surfactants. The nonionic styrene-butadiene latexes cannot be used as "wet-end additives" in a conventional papermaking process. Instead, these nonionic latexes have to be impregnated or pattern-printed on the subsequently laid paper furnish, such as by the process described in European Patent application 33,988 to Graves et al, published Aug. 19, 1981.

An anionic styrene-butadiene latex can be used in a conventional wet-end additive papermaking process by adding a cationic polyelectrolyte. See, for example, U.S. Pat. No. 4,121,966 to Amano et al, issued Oct. 24, 1978; and U.S. Pat. No. 2,745,744 to Weidner et al, issued May 15, 1956. The cationic polyelectrolyte used is typically a water-soluble cationic wet-strength agent. Basically, the cationic polyelectrolyte, when added, destabilizes the dispersed anionic latex particles which then flocculate and deposit on the paper fibers. Accordingly, the cationic polyelectrolyte and anionic styrene-butadiene latex cannot be combined together until the point at which they are used as the binder system in paper-making.

Polyethylene glycols (PEG) and PEG fatty esters and ethers are also used as wetting agents and plasticizers for paper products. Unfortunately these PEG derivatives are not substantive to the cellulose fibers. And the process involved to incorporate the PEG into the paper can be problematic and expensive.

U.S. Pat. No. 5,240,562 to Phan et al. issued on Aug. 31, 1993 and discloses the use of preformed vesicles as a means of carrying these non-substantive PEGs into the final paper substrate. However, these vesicles require preparing, maintaining and delivering complex formulations at high temperatures to the wet end of the paper machine.

U.S. Pat. No. 3,434,984 to James Hyland issued on Mar. 25, 1969 discloses thermosetting cationic resins which impart wet strength and water holdout properties to cellulosic materials. These resins are prepared by reacting epichlorohydrin and a polyamide. However, these materials can only be incorporated into the web at high temperatures of up to 200° C.

There is a need in the paper industry to provide a paper product and a method for making the product where incorporation of wet strength agents can be done efficiently and at room temperature while enhancing the softness and absorbency of the paper product.

The present invention provides an absorbent paper product that overcomes the disadvantages associated with the prior art technologies.

The present invention also overcomes the disadvantages associated with the prior art technologies by providing a method for making soft and absorbent wet strengthened paper products.

SUMMARY OF THE INVENTION

It has been discovered that a paper product with a hydrophobically modified polyaminamide, preferably stable complexes of these with nonionic polyalkoxides, and a standard wet strength agent improves the quality of the paper product, particularly making the wet strengthened product softer and more absorbent.

One embodiment of the present invention discloses a paper product comprising hydrophobically modified polyaminamides wherein the hydrophobic moieties are selected from mono-fatty esters, acids or epoxides and the polyaminamide is hydrophobically modified such that the hydrophobic group comprises 5 to 10 mole percent of the active amine sites on the polymer backbone.

Another embodiment of the present invention is a method for producing a paper product comprising adding a complex of the hydrophobically modified polyaminamides described above and a nonionic surfactant selected from mono-fatty esters or ethers of polyethylene glycol. Further, the amount of nonionic surfactant can be adjusted to accommodate all or a fraction of the hydrophobically modified polyaminamide sites on the polymer backbone. The complex is quite stable and accordingly is readily delivered and retained within the paper product under ambient conditions.

It has been found that complexes of hydrophobically modified polyaminamides and mono-fatty esters or ethers of polyethylene glycol provide similar increases in wet/dry tensile ratio in wet strengthened substrates as non-complexed hydrophobically modified polyaminamides. However, the complexed species once in the sheet of the paper product enhances the wettability of the substrate; thereby, improving both the absorbency rate and drape of the towel product. Particularly suitable nonionic surfactants include fatty sorbitols, fatty glucosides and the like.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE EMBODIMENTS

Reference will now be made in detail to the present embodiments of the invention. The present invention relates to an improved soft and absorbent paper product comprising a hydrophobically modified polyaminamide. It has been discovered that adding hydrophobically modified polyaminamides (HMCP) or, preferably a stable complex of HMCP with a nonionic surfactant and a wet strength resin achieves a softer and more absorbent wet strengthened paper product which has wet strength generally comparable to, or possibly even superior to, similar products made with wet strength resin alone.

The absorbent paper product of the present invention can be manufactured on any type papermaking machine. Traditionally, the production of absorbent paper toweling occurs by one of three basic technologies: (i) conventional wet press technology with wet creping and embossing, as described in U.S. Pat. No. 5,048,589 to Cook et al. which is incorporated herein by reference in its entirety; (ii) conventional wet press technology with dry creping and embossing, as described in U.S. Pat. No. 5,048,589 which is incorporated herein by reference in its entirety; and most recently (iii) through-air-drying (TAD) with or without creping. Conventional TAD processes are generally described in U.S. Pat. Nos. 3,301,746 to Sanford et al. and 3,905,863 to Ayers, which are incorporated herein by reference in their entirety.

Paper is generally manufactured by suspending cellulosic fiber of appropriate geometric dimensions in an aqueous medium and then removing most of the liquid. The paper derives some if its structural integrity from the mechanical arrangement of the cellulosic fibers in the web, but most, by far, of the paper's strength is derived from hydrogen bonding which links the cellulosic fibers to one another. The degree of strength imparted by this inter-fiber bonding, while necessary to the utility of the product, can result in a lack of perceived softness that is inimical to consumer acceptance. One common method of increasing the perceived softness of a paper product is to crepe the paper. Creping is generally effected by fixing the cellulosic web to a Yankee drum thermal drying means with an adhesive/release agent combination and then scraping the web off the Yankee by means of creping blade. Creping, by breaking a significant number of inter-fiber bonds, adds to and increases the perceived softness of the resulting absorbent paper product.

Another method of increasing a web's softness is through the addition of chemical softening and debonding agents. Compounds such as quaternary amines that function as debonding agents are often incorporated into the paper web. These cationic quaternary amines can be added to the initial fibrous slurry from which the paper web is subsequently made. Alternatively, the chemical debonding agent may be sprayed onto the cellulosic web after it is formed but before it is dried, however as mentioned, the degree of reduction in ultimate tensile strength is generally somewhat less by spraying than that attained with wet end addition.

Papermaking fibers used to form the soft absorbent products of the present invention include cellulosic fibers commonly referred to as wood pulp fibers, liberated in the pulping process from softwood (gymnosperms or coniferous trees) and hardwoods (angiosperms or deciduous trees). The particular tree and pulping process used to liberate the tracheid are not critical to the success of the present invention. Cellulosic fibers from diverse material origins may be used to form the web of the present invention, including non-woody fibers liberated from sabai grass, rice straw, banana leaves, paper mulberry (i.e. bast fiber), abaca leaves, pineapple leaves, esparto grass leaves, and fibers from the genus hesperalae in the family agavaceae. Also recycled fibers which may contain any of the above fibers sources in different percentages can be used in the present invention.

Papermaking fibers can be liberated from their source material by any one of the number of chemical pulping processes familiar to the skilled artisan including sulfate, sulfite, polysulfite, soda pulping, etc. The pulp can be bleached if desired by chemical means including the use of chlorine, chlorine dioxide, oxygen, etc. Furthermore, papermaking fibers can be liberated from source material by any one of a number of mechanical/chemical pulping processes familiar to anyone experienced in the art including mechanical pulping, thermomechanical pulping, and chemithermomechanical pulping. These mechanical pulps can be bleached, if one wishes, by a number of familiar bleaching schemes including alkaline peroxide and ozone bleaching.

The suspension of the fibers or furnish may contain chemical additives to alter the physical properties of the paper produced. These chemistries are well understood by the skilled artisan and may be used in any known combination.

The hydrophobically modified polyaminamides of the present invention are compatible with conventional permanent wet strength agents. The hydrophobically modified polyaminamides form a stable complex with nonionic surfactant such as mono-fatty esters and ethers of polyethylene glycol. This complex carries the usually non-substantive nonionic surfactant into the sheet of paper.

As used herein, the term "polyaminamide" represents a polymer of an amine moiety with an amide substituent or a polymer of an amide moiety with an amine substituent. That is, it is a polymer having both amine and amide groups along the backbone.

The hydrophobically modified polyaminamide may be produced by any known means to those known in the arts. For example HMCP maybe produced by reacting a polyaminamide with (i) an epoxide of a long hydrocarbon, or (ii) an ester of a fatty acid, or (iii) an acylchloride of a fatty acid, or (iv) a fatty acid.

As used herein, the term "epoxide" represents a three-membered cyclic ether which can be optionally substituted with any functionality known to those of ordinary skill in the art.

As used herein, the term "fatty acid" represents long-chains of aliphatic acids.

The molecular weight of the HMCP is adjusted by any means known to those skilled in the art, a preferred example is by cross-linking the HMCP, at 12% solids, with epichlorohydrin. Low solids are required for the cross-linking reactions because of the tendency of the HMCP's to associate are higher solids. The preferred solids content is typically below about 20% by weight depending on the molecular weight with lower solids contents being preferred for higher molecular weight formulations to safeguard against gelation.

Any suitable wet strength agents, typically used to impart wet strength to toweling, can be selected by those of ordinary skilled in the art, a non-limiting example is polyaminamide-epichlorohydrin (PAE). Gloxylated polyacrylamides are also usable.

The level of hydrophobic groups in the polyaminamide required to achieve the desired paper performance effects of the present invention is preferably between 5 and 10 mol % of the active amine sited on the polymer backbone.

Stable complexes of the HMCP's and mono-fatty esters of polyethylene glycols are easily formed by mixing the two components and heating to the cloud point temperature of the PEG ester. The resultant clear solutions can be stored at any temperature that does not alter the desired chemical or physical nature of the composition. The solution is preferably stored at room temperature but is stable over the range of temperatures typically encountered in mills and warehouse facilities. We prefer to effect the complexing at neutral pH but, depending on the nature of the nonionic surfactant, the complexing can be accomplished at other pH values if the nonionic surfactant is stable at that pH. For a whole host of practical reasons, the most preferred solvent for effecting the complexing is water but other polar solvents can be used if the other components are soluble therein and do not react therewith.

The amount of HMCP necessary depends upon the molecular weight of the HMCP as can be determined by those skilled in the art. The amount of nonionic surfactant complexed with the HMCP can range from 0 to 1 equivalent of the hydrophobe content of the HMCP.

In use, the HMCP is complexed with a mono-fatty ester of polyethylene glycol. Preferably the latter has an elevated hydrophile-lipophile balance (HLB), in water. Because this complex is stable, it can be easily used and stored over a wide range of commonly encountered ambient temperatures and transported then mixed if desired with a wet strength agent for the paper prior to its incorporation in the wet end of the paper machine. Alternatively, it can be added to the paper making process alone or in a line separate from any wet strength agent.

Further, since the cationic nature of the HMCP makes it highly substantive to cellulosic fibers, the complex with the mono-fatty esters or ethers of polyethylene glycols carries these mono-fatty esters or ethers of polyethylene glycols into the sheet and retains them there. This is a very significant advantage as the polyethylene glycol is not normally substantive to the sheet which severely limits the ease with which it may be incorporated into the sheet. The complexes of HMCP's and PEG esters or ethers provide similar increases in wet/dry tensile ratio as the non-complexed HMCP's while carrying the non-substantive PEG ester or ether into the substrate. The PEG ester or ether once in the sheet enhances the wettability of the substrate; thus, improving both absorbency rate and drape of the paper product. The amount of HMCP retained in the sheet may be between about 0.5 and about 2 pounds per ton of dry fiber.

EXAMPLE 1

The following table (Table 1) illustrates the properties of a paper towel made with the composition of the present invention as compared to the paper towels in the market. The table measures the wet breaking length, water absorbency rate (WAR), and a wet over dry tensile ratio. The HMCP was prepared by treating a non-cross-linked polyaminamide with 1,2-epoxyoctadecane. The amount of HMCP was 1.5 pounds per ton. Then HMCP was complexed with 1 equivalent PEG-400-mono-oleate (based on level of C-18 in HMCP, which was 9.1 mol % of amino groups on the polyaminamide), the wet strength resin used was Amres LA 12JR added at 1% to the pulp.

TABLE 1

|  | Without HMCP Complex | With HMCP Complex |
|---|---|---|
| Wet Breaking Length (km) | 0.61 | 0.69 |
| Water Absorbency Rate (seconds) | 16.4 sec | 9.5 sec |
| Wet Over Dry Tensile Ratio (%) | 23% | 32% |

Table 2 represents a summary of polymeric surfactant studies for increasing percent wet/dry tensile ratio. The complexes of HMCP's and PEG esters provide similar increases in wet/dry tensile ratio as the non-complexed HMCP's while carrying the non-substantive PEG ester into the substrate. The PEG ester once in the sheet enhances the wettability of the substrate. This wettability improves both absorbency rate and drape of the absorbent paper product.

TABLE 2

| LA12LR #/T | CMC #/T | HMAP$^A$ mol % C18 | HMAP #/T | HMAP$^B$ mol % C18 | $M_z$ dalton | HMCP #/T | Other Additive | Other Additive #/T | Wet Breaking Length (km) | %/w/d | % w/d S.D. |
|---|---|---|---|---|---|---|---|---|---|---|---|
| 20 | | | | | | | | | 0.6 +/− 0.1 | 28 | +/−3 |
| 20 | 3.0 | | | | | | | | 0.62 | 31 | +/−5 |
| 7 | | | | | | | | | 0.54 +/− 0.08 | 26 | +/−3 |
| 20 | | | | 6.5$^C$ | | 2.0 | | | 0.63 | 34 | +/−2 |
| 7 | | | | 8.7 | 59K | 1.0 | | | 0.62 | 31 | +/−1 |
| 7 | | | | 7.5$^E$ | | 1.0 | | | 0.60 | 30 | +/−2 |
| 7 | | | | 7.5$^E$ | 7K | 0.3 | | | 0.70 | 30 | +/−7 |
| 7 | | | | 8.7 | 7K | 1.5 | | | 0.61 | 29 | +/−1 |
| 7 | | | | 8.7 | 118K | 0.5 | | | 0.61 | 29 | +/−1 |
| 7 | | | | 8.7 | 118K | 0.5 | Lumulse 40-O$^F$ | G | 0.53 | 29 | +/−3 |
| 20 | | 7.03 | 4.8 | | | | | | 0.49 | 28 | +/−1 |
| 7 | | | | 5.2 | | 0.5 | | | 0.63 | 28 | +/−1 |
| 7 | | | | 8.7 | 118K | 1.5 | | | 0.57 | 28 | +/−2 |
| 7 | | | | 8.7 | 7K | 0.5 | | | 0.59 | 28 | +/−2 |
| 7 | | | | 8.7 | 7K | 1.0 | | | 0.57 | 28 | +/−2 |
| 7 | | | | 8.7 | 59K | 0.5 | | | 0.51 | 27 | +/−1 |
| 7 | | | | 7.5$^E$ | | 0.5 | | | 0.58 | 27 | +/−2 |
| 7 | | | | 8.7 | 118K | 1.0 | | | 0.60 | 27 | +/−2 |
| 7 | | | | 8.7 | 7K | 1.5 | Lumulse 40-O$^F$ | G | 0.54 | 27 | +/−2 |
| 20 | | 5.00 | 6.3 | | | | | | 0.60 | 26 | +/−1 |
| 7 | | | | 8.7 | 59K | 1.5 | | | 0.45 | 26 | +/−2 |
| 7 | | | | 5.2 | | 1.5 | | | 0.56 | 26 | +/−2 |
| 20 | | 6.73$^D$ | 3.0 | | | | | | 0.63 | 25 | |
| 7 | | | | 5.2 | | 1.0 | | | 0.54 | 24 | +/−2 |

$^A$Hydrophobically modified anionic polymer: polyethylene-co-maleic anhydride treated with octadecylamine unless otherwise stated
$^B$Hydrophobically modified cationic polymer: A polyaminamide, based on diethylenetriamine, derivatized with 1,2-epoxyoxtadecane unless otherwise stated
$^C$A polyaminamide treated with methyloleate
$^D$Polyethylene-co-maleic anhydride treated with N-methyloctdecylamine
$^E$A polyaminamide based on di-(3-aminopropyl)methylamine
$^F$PEG-400-mono-oleate
$^G$Formulated with HMCP by heating 1 eq. (based on mol C18 units) Lumulse with HMCP to cloud point of Lumulse (i.e., 70° C.) to obtain stable clear product Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising a stable complex of a hydrophobically modified polyaminamide and a nonionic surfactant.

2. The complex according to claim 1, wherein said nonionic surfactant is chosen from at least one of mono-fatty esters of polyethylene glycols.

3. The complex according to claim 1, wherein said nonionic surfactant is chosen from at least one of mono-fatty ethers of polyethylene glycols.

4. The complex according to claim 1, wherein said hydrophobically modified polyaminamide comprises a hydrophobic substituent on 5 to 10 mole percent of the active amine sites on the polymer backbone.

5. The complex according to claim 1, wherein said nonionic surfactant is chosen from at least one of mono-fatty esters of polyethylene glycols and mono-fatty ethers of polyethylene glycols.

* * * * *